United States Patent
Iimura

(10) Patent No.: US 7,483,181 B2
(45) Date of Patent: Jan. 27, 2009

(54) OPTICAL READ DEVICE, INFORMATION PROCESSING DEVICE USING OPTICAL RECORDING MEDIUM, AND INFORMATION REPRODUCTION METHOD

(75) Inventor: Shinichiro Iimura, Tokyo (JP)

(73) Assignee: Sony Corporation, Tokyo (JP)

( * ) Notice: Subject to any disclaimer, the term of this patent is extended or adjusted under 35 U.S.C. 154(b) by 909 days.

(21) Appl. No.: 10/494,072

(22) PCT Filed: Aug. 29, 2003

(86) PCT No.: PCT/JP03/11083

§ 371 (c)(1),
(2), (4) Date: Apr. 28, 2004

(87) PCT Pub. No.: WO2004/023465

PCT Pub. Date: Mar. 18, 2004

(65) Prior Publication Data

US 2005/0007638 A1    Jan. 13, 2005

(30) Foreign Application Priority Data

Sep. 3, 2002   (JP) ............................. 2002-257463

(51) Int. Cl.
*H04N 1/04* (2006.01)
(52) U.S. Cl. ...................... 358/474; 358/482; 358/475; 358/509; 369/112.12
(58) Field of Classification Search .............. 358/474, 358/482, 483, 475, 509, 1.2, 1.9; 369/112.12, 369/112.15, 44.37, 44.23, 112.19
See application file for complete search history.

(56) References Cited

U.S. PATENT DOCUMENTS

| | | | |
|---|---|---|---|
| 6,594,221 B2 * | 7/2003 | Ogasawara | 369/112.19 |
| 7,106,682 B2 * | 9/2006 | Ueyama et al. | 369/112.15 |
| 7,206,106 B2 * | 4/2007 | Kim | 359/15 |
| 7,315,502 B2 * | 1/2008 | Sakai et al. | 369/112.04 |

FOREIGN PATENT DOCUMENTS

| | | |
|---|---|---|
| JP | 59-152543 | 8/1984 |
| JP | 63-261540 | 10/1988 |
| JP | 64-35727 | 2/1989 |
| JP | 08-17061 | 1/1996 |
| JP | 10-83539 | 3/1998 |

* cited by examiner

*Primary Examiner*—Edward L Coles
*Assistant Examiner*—Negussie Worku
(74) *Attorney, Agent, or Firm*—Oblon, Spivak, McClelland, Maier & Neustadt, P.C.

(57) ABSTRACT

An optical reading unit which ensures that address information recorded as guide groove wobbles on an optical recording medium is easily played back. A light-receiving device (20) for detecting returning light from the optical recording medium has detection areas (21A to D) delimited by a plurality of split lines (22), (23), and (24). The position of one of the split lines functioning as a detection reference line is changed according to the position of a returning light spot S on a light-receiving surface (21) of the light-receiving device (20) and push-pull signals (PP1 to 3) are acquired by calculating the difference between signals received on two detection areas delimited by the split line to eliminate common-mode components.

7 Claims, 11 Drawing Sheets

FIG. 12B
BACKGROUND ART
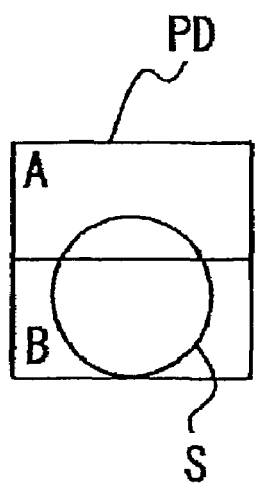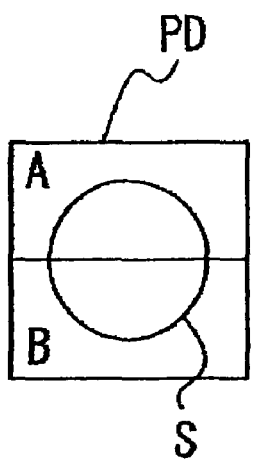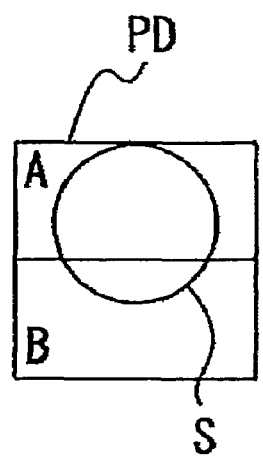
FIG. 12A　　　　　　　　　　　　　　FIG. 12C
BACKGROUND ART　　　　　　　BACKGROUND ART

OPTICAL READ DEVICE, INFORMATION PROCESSING DEVICE USING OPTICAL RECORDING MEDIUM, AND INFORMATION REPRODUCTION METHOD

TECHNICAL FIELD

The present invention relates to a technology for satisfactorily eliminating common-mode components occurring when a push-pull signal is generated in an apparatus utilizing an optical recording medium and detecting address information contained in such a push-pull signal by using a split light-receiving device which has a light-receiving surface divided by a plurality of split lines and by selecting one of the split lines according to the position of the light spot on the light-receiving surface, thus overcoming a problem with the push-pull method (that is, a problem of DC offset, which occurs when the center of a returning light spot does not coincide with the center of the split light-receiving device).

BACKGROUND ART

Recording/playback apparatuses using optical recording media such as compact disks (CDs) and digital versatile disks (DVDs) are known. Information-writable optical disks such as CD-R/RW, DVD+RW, and DVR have address information recorded thereon by wobbling guide grooves (in other words, address information recorded by optical modulation based on an address signal is embedded as groove wobbles).

FIG. 9 schematically shows wobbling on a disk, where wave-shaped lands and grooves are arranged alternately in the radial direction of the disk.

For DVD-R/RW, land prepits (LPP) represent address information, as shown in FIG. 10.

Guide groove wobbling is seen in both formats where information detected as wobbles is used for disk rotation servo (CLV servo) control, phase-locked loop (PLL) frequency locking of recorded clocks, and speed component detection, etc.

To acquire address information, a push-pull (PP) signal is used during wobble detection.

"Push-pull signal" here designates a light-difference signal (a so-called radial push-pull signal) detected by a split detector. In detail, as shown in FIG. 11, light radiated onto an optical disk is reflected at the recording layer of the disk, and a spot S of the returning light is received on a two-split detector PD. The detector PD is divided into two areas by a split line a running through its center. The difference between the signal received at one area (area A) and the signal received at the other area (area B) is calculated by a subtractor b, whereby the radio frequency (RF) components in the signal are eliminated (elimination of common-mode components) to produce a push-pull signal.

A signal containing address information (address signal) is more difficult to detect after data is written onto a disk, in which case disturbance from pits (record marks) affects the detection, than before the data is written onto the disk.

A known structure has the following problem with address detection based on a push-pull signal (with reference to FIGS. 12A to 12C).

The elimination of common-mode components described above assumes that the spot S of returning light lies just at the center of the two-split detector PD (with reference to FIG. 12B). For this reason, elimination of common-mode components is not satisfactory in the presence of a shift of the light spot towards either side from the center of the two-split detector, such as when the spot S lies biased towards the area B (as shown in FIG. 12A) or the area A (as shown in FIG. 12C) of the detector.

If a shift in an objective lens due to, for example, deflection causes the light spot on the two-split detector to be positionally deviated, signals of respective amounts of light become unbalanced, preventing satisfactory elimination of RF components from the signals. As an unfortunate result, it becomes difficult to acquire recorded address information or the structure of detection circuits becomes complicated.

Accordingly, an object of the present invention is to ensure that information recorded on an optical recording medium (including address information) is easily played back.

DISCLOSURE OF INVENTION

In order to overcome the above-described problems, according to the present invention, a light-receiving device functioning as means for detecting returning light from an optical recording medium has detection areas delimited by a plurality of parallel split lines, and changes the detection reference line according to the position of the returning light spot on the light-receiving surface of the light-receiving device. In more detail, the position of one of the split lines which functions as the detection reference line is changed depending on the deviation of the spot position, thereby calculating the difference between signals of the light received on two respective areas delimited by the one split line to acquire a push-pull signal.

According to the present invention, despite a positional deviation in a returning light spot on the split light-receiving device, one of the split lines can be selected depending on the position of the light spot to calculate the difference between two signals received on detection areas delimited by the selected split line, thereby eliminating the common-mode components.

BRIEF DESCRIPTION OF THE DRAWINGS

FIGS. 12A to 12C illustrate a disadvantage associated with a shift of the spot position of returning light.

BEST MODE FOR CARRYING OUT THE INVENTION

The present invention relates to optical reading units where light is radiated onto an optical recording medium, information processing apparatuses using an optical recording medium (for example, recording/playback apparatuses), and an information playback method. The present invention assumes that returning light from an optical recording medium is detected to acquire a push-pull signal, and is preferably applicable to, for example, an optical recording medium having address information recorded as wobble information, where the address information contained in a push-pull signal is played back.

Figure 1:
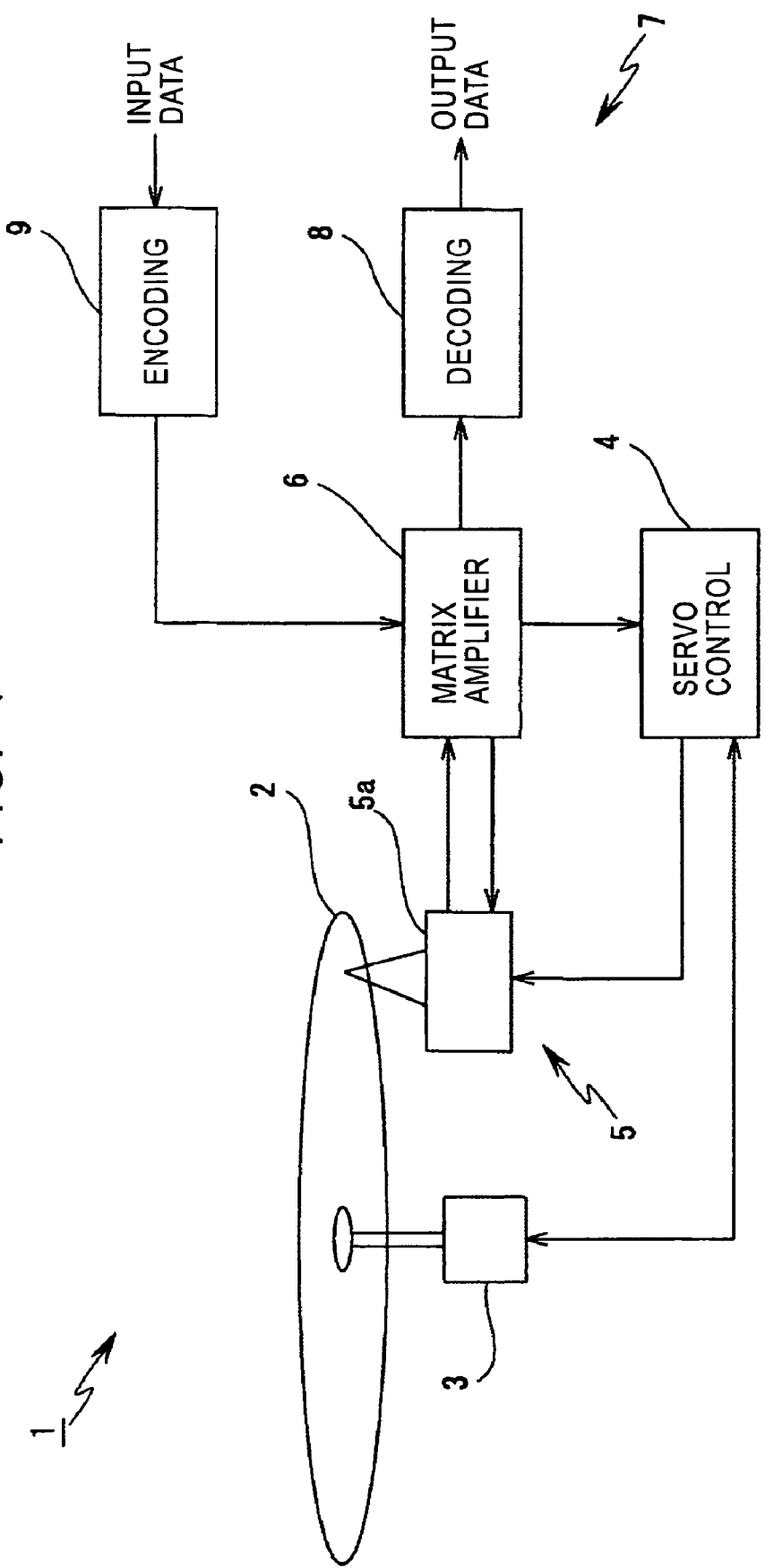
FIG. 1 is a block diagram showing an exemplary structure of an information processing apparatus using an optical recording medium.

FIG. 1 shows a basic structure according to the present invention, illustrating an exemplary structure of an optical disk recording/playback apparatus.

An optical recording medium 2 used in an information processing apparatus 1 has various types of information, including user data, recorded thereon, and such information is read out using laser beam radiation.

The present invention is applicable to a disk-shaped recording medium (referred to hereinafter just as "a disk"), regardless of the recording format, recording medium, shape, etc. This disk has address signals recorded as groove wobble information.

The optical recording medium 2 is rotated by a spindle motor functioning as a drive source 3, where the spindle motor is controlled by a signal from a servo control circuit 4.

An optical reading unit 5 includes an optical pickup (or optical head) 5a, the pickup having its operation (tracking servo control or focus servo control associated with driving of the objective lens, thread control for changing the field position, etc.) controlled by the servo control circuit 4.

A signal detected by the optical pickup 5a is sent to a matrix amplifier 6, where a tracking error signal, a focus error signal, a push-pull signal, and an information signal (or an information playback signal) are acquired. The tracking error signal and the focus error signal are supplied to the servo control circuit 4 for focus control associated with the objective lens of the optical pickup 5a and tracking control. The push-pull signal is a signal representing the difference in the amounts of light acquired by a split detector, which is described later, and is sent to a decoding section, which is also described later, for detecting address information. In short, the address information is recorded on a disk as groove wobble and can therefore be detected from the push-pull signal.

A signal-processing section 7 includes a decoding section 8 and an encoding section 9.

The above-described information signal acquired in the matrix amplifier 6 is supplied to the decoding section 8 and is then decoded as user data. In other words, the decoding section 8 includes, for example, a decoding circuit and an error correcting code (ECC) circuit for decoding the signal to pre-record data, correcting code errors, if any, and finally outputting the data.

When data is to be recorded, input user data is sent to the encoding section 9. In the encoding section 9, the ECC circuit adds error-correcting codes to the data and the encoding circuit performs encoding necessary for data recording. Subsequently, an output signal from the encoding section 9 is sent to the matrix amplifier 6, where the signal is written onto the disk.

Although not shown in the figure, control means including, for example, a central processing unit (CPU) and memory is provided.

Figure 2:
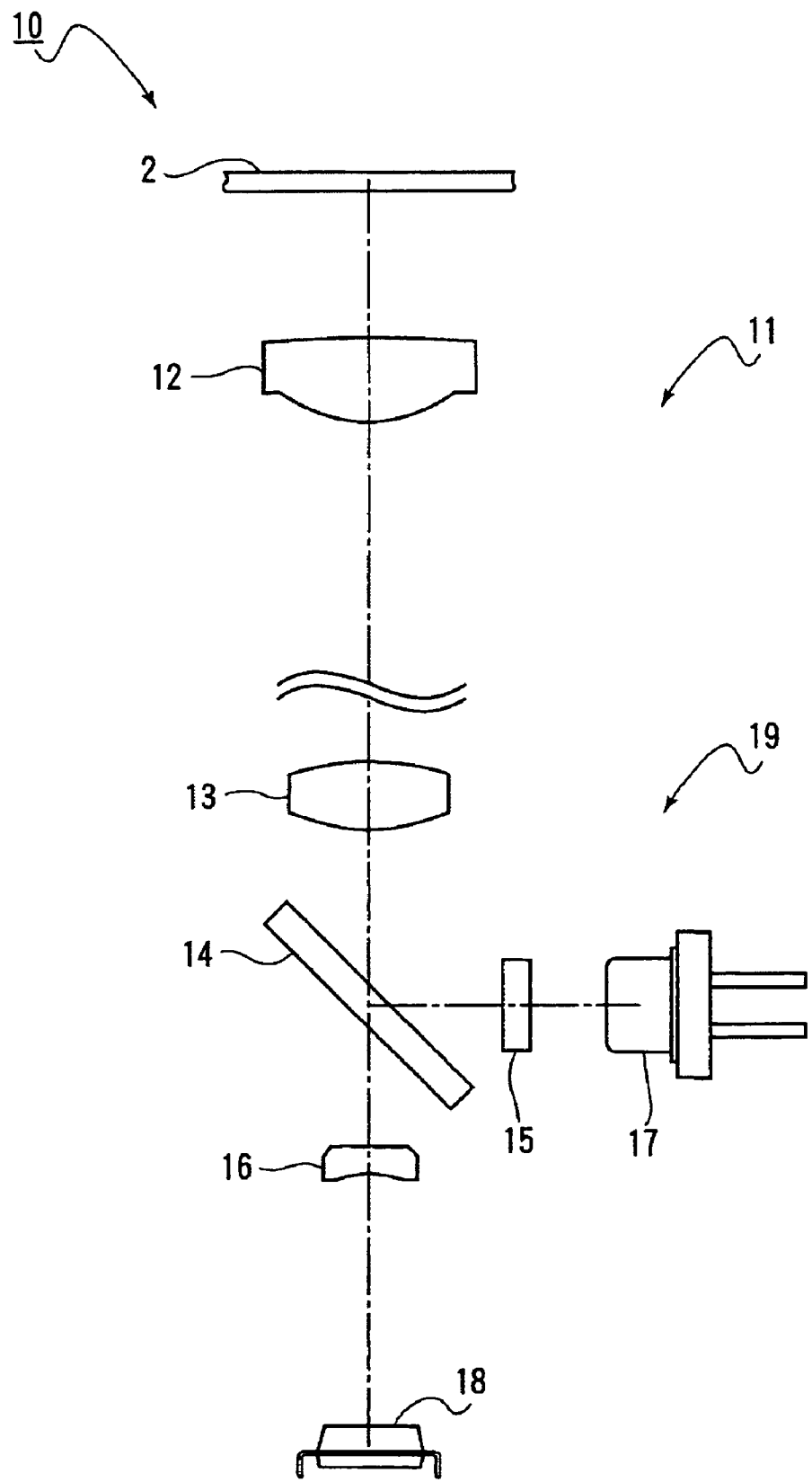
FIG. 2 shows an exemplary structure of an optical reading unit.

FIG. 2 schematically shows an exemplary structure 10 of the optical reading unit, specifically the main part not including a detection circuit.

An optical system 11 is composed of an objective lens 12, a collimator (lens) 13, a beam splitter 14, a grating 15, and an adjustment lens 16.

A laser diode (LD) is used as a light source 17. A laser beam emitted from the laser diode passes through the grating 15, is reflected on the beam splitter 14, becomes a parallel beam at the collimator 13, passes through the objective lens 12, and enters an optical recording medium 2.

Light-receiving means (photodetector) 18 is provided for signal detection for the returning light from the optical recording medium 2 (including a signal indicating recorded information, as well as various error signals). A split light-receiving device (described later in detail) is used for this light-receiving means 18, and functions as detecting means for acquiring a push-pull signal. The returning light from the optical recording medium 2 passes through the objective lens 12, the collimator 13, the beam splitter 14, and the adjustment lens 16 to the light-receiving means 18, where the returning light is subjected to photoelectric conversion.

The optical system 11, which includes the objective lens 12 and the collimator 13, constitutes light radiating means 19 in conjunction with the light source 17 to radiate a beam onto the optical recording medium 2.

The figure illustrates an example where the light source 17 and the light-receiving means 18 are separate devices from each other. A structure which use an integrated optical device can be employed as light-radiating/receiving means including a light source and light-receiving means.

The present invention is intended to satisfactorily eliminate common-mode components when a push-pull signal is generated, despite a shift (or displacement) of the returning light spot on the light-receiving surface of the light-receiving device, thereby preventing the above-described problem (that is, occurrence of a DC offset).

FIGS. 3A to 3C and 4A to 4C illustrate the principle for detecting a push-pull signal.

Figures 3A, 3B, 3C:
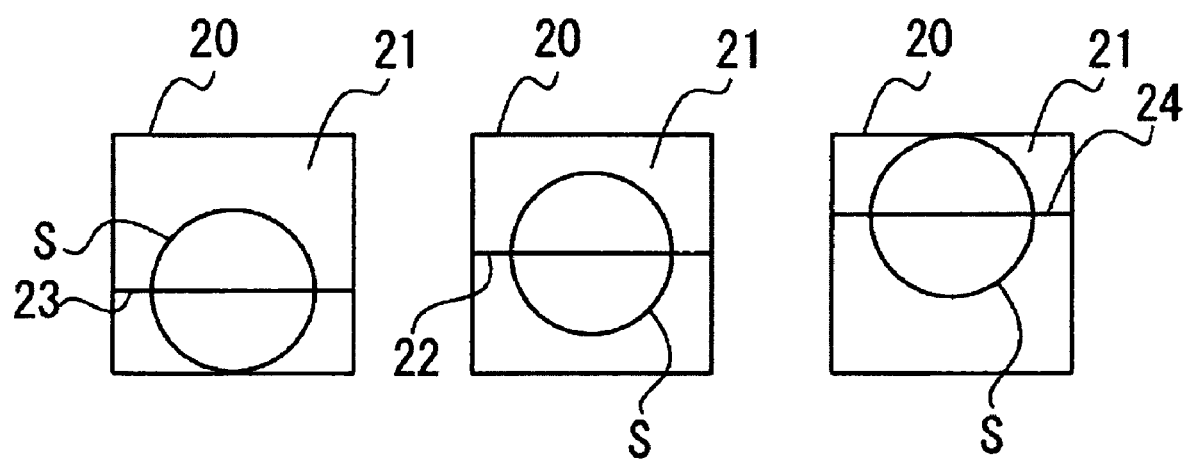
FIGS. 3A to 3C, as well as FIGS. 4A to 4C, illustrate the principle for the operation of detection according to the present invention.

Referring to FIGS. 3A to 3C, FIG. 3B shows that the center of a circular returning light spot S lies substantially coincident with the center of a light-receiving surface 21 on a light-receiving device 20. FIG. 3A to the left of FIG. 3B shows that the center of the returning light spot S lies slightly below the center of the light-receiving surface 21 on the light-receiving device 20, while FIG. 3C to the right of FIG. 3B shows that the center of the returning light spot S lies slightly above the center of the light-receiving surface 21 on the light-receiving device 20.

FIGS. 3A to 3C differ from FIGS. 12A to 12C in that the split lines (with reference to 22 to 24) shown on the light-receiving surface 21 of the light-receiving device 20 are not always the same, but differ according to the position of the light spot S.

For example, in FIG. 3B, the light-receiving surface 21 is divided into two areas by the split line 22, which coincides with the center line of the light-receiving surface 21 extending in the left/right direction in the figure. In contrast, in FIG. 3A, the light-receiving surface 21 is divided by the split line 23, which is located below the split line 22 in the figure. In FIG. 3C, the light-receiving surface 21 is divided by the split line 24, which is located above the split line 22 in the figure. Thus, changing the split line on the light-receiving surface according to the direction in which the light spot shifts allows a split line to be specified at or near the center of the light spot, thereby calculating the difference between light-reception signals of the two respective detection areas (or light-receiving areas) delimited by the split line to eliminate the common-mode components.

Of course, it may be possible to move the light-receiving device itself according to the position of the light spot on the light-receiving surface; this, however, requires a moving mechanism and control thereof. Hence, as employed in the present invention, changing the split line as a detection reference line depending on the position of the light spot is simpler and more cost-effective.

Figure 4C:
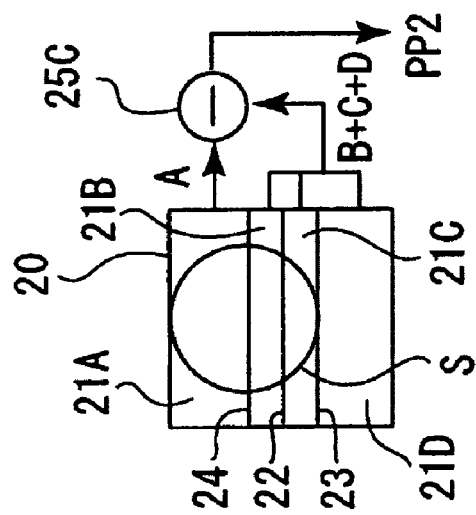
FIGS. 4A to 4C illustrate an arithmetic operation for a push-pull signal depending on the position of a split line.
Figure 4B:
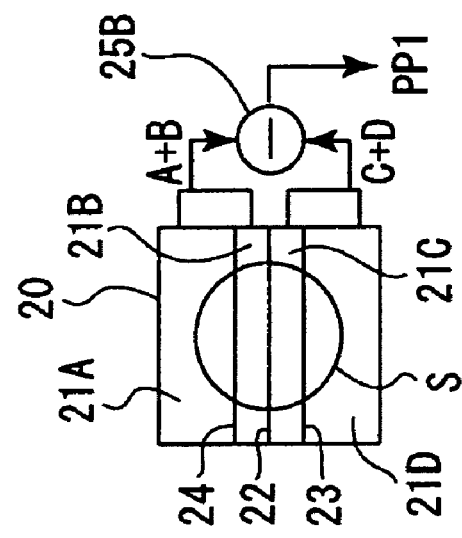
Figure 4A:
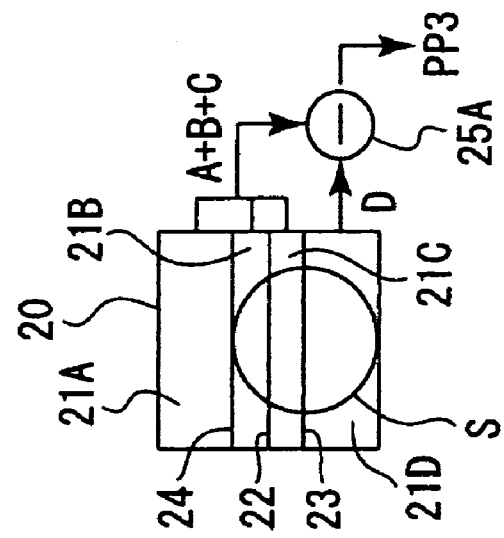

FIGS. 4A to 4C show an example where three parallel split lines are set on a light-receiving surface. FIGS. 4A to 4C correspond to FIGS. 3A to 3C, respectively.

In this example, the light-receiving surface 21 is divided into four detection areas by the split line 22 located on the center of the light-receiving surface 21 and split lines 23 and 24 located above and below the split line 22, respectively.

In FIGS. 4A to 4C, the light-receiving surface 21 is divided into detection areas 21A, 21B, 21C, and 21D from top to bottom. In this example, the detection areas are located symmetrical with respect to the split line 22. The detection areas 21B and 21C, which are located right above and below the split line 22, have a smaller width than detection areas 21A and 21D located around detection areas 21B and 21C.

In FIG. 4B, the center of the light spot S is located substantially at the center of the light-receiving surface 21, in which case, the split line 22 is selected as the detection reference line. Therefore, signals detected on detection areas 21A and 21B located above the split line 22 (referred to as "A+B") are sent to the subtractor 25B. Signals detected on detection areas 21C and 21D located below the split line 22 (referred to as "C+D") are sent to the subtractor 25B. Therefore, the differential signal "A+B−(C+D)" between the detection signal "A+B" and the detection signal "C+D" is calculated in the subtractor 25B to acquire a push-pull signal (referred to as "PP1").

In FIG. 4A, the center of the light spot S is located below the center of the light-receiving surface 21, in which case, the split line 23 is selected as the detection reference line. Therefore, signals detected by detection areas 21A, 21B, and 21C above the split line 23 (referred to as "A+B+C") are sent to the subtractor 25A. Similarly, a signal detected by detection area 21D below the split line 23 (referred to as "D") is sent to the subtractor 25A. Therefore, the differential signal "(A+B+C)−D" between the detection signal "A+B+C" and the detection signal "D" is calculated in the subtractor 25A to acquire a push-pull signal (referred to as "PP3").

In FIG. 4C, the center of the light spot S is located above the center of the light-receiving surface 21, in which case, the split line 24 is selected as the detection reference line. Therefore, a signal detected by detection area 21A above the split line 23 (referred to as "A") is sent to the subtractor 25C. Similarly, a signal detected by detection areas 21B, 21C, and 21D below the split line 24 (referred to as "B+C+D") is sent to the subtractor 25C. Therefore, the differential signal "A−(B+C+D)" between the detection signal "A" and the detection signal "B+C+D" is calculated in the subtractor 25C to acquire a push-pull signal (referred to as "PP2").

In all cases, a push-pull signal can be acquired from the difference between the amounts of light detected on the areas delimited by the split line running substantially through the center of the light spot. In other words, the problem of a shift or displacement of the spot on the light-receiving surface can be addressed by changing the position of the split line functioning as the detection reference line according to the spot position of the returning light on the light-receiving surface. Therefore, calculating the difference between signals detected on the two detection areas delimited by the split line functioning as the detection reference line is advantageous for detecting the above-described address information, because components not necessary for the acquired push-pull signal (RF components) remain very small.

The plurality of parallel split lines are perpendicular or substantially perpendicular to the shift direction of the light spot on the light-receiving surface (a case where the split lines are parallel to the shift direction of the light spot is excluded). In this example, three split lines are set, and the arithmetic expressions for detection signals associated with the detection areas are switched according to the shift of the light spot. This processing is performed by matrix processing. In short, this processing is carried out in the above-described matrix amplifier 6. An effect identical to the split line being physically shifted can be exhibited through calculation.

The positions of split lines could be displaced from the center of light spot depending on the position of the light spot on the light-receiving surface; this problem can easily be addressed by increasing the number of split lines. In other words, the higher the number of split lines, the higher the number of choices of a split line depending on the light spot position, thereby allowing a higher quality signal to be acquired (even three split lines are satisfactory, and increasing the number of divisions is still more effective). The number of divisions should be determined according to the degree of complication of processing and to cost.

The intervals between the split lines should be determined appropriately taking into consideration that the split line need to be located within the range where the light spot shifts.

In order to determine the positions of the split lines, it is necessary to detect the position of the light spot on the light-receiving surface. In other words, it is necessary to determine in which direction and how much the light spot is shifted with respect to the light spot position (neutral position) shown in FIGS. 3B and 4B.

When the above-described three split lines are to be set, it is necessary to detect whether the center of the light spot is located substantially at the center or near the center of the light-receiving surface or whether the center of the light spot is shifted above or below the light-receiving surface, and then select one of the push-pull signals (PP1 to 3) depending on the result of the detection.

Figure 5:
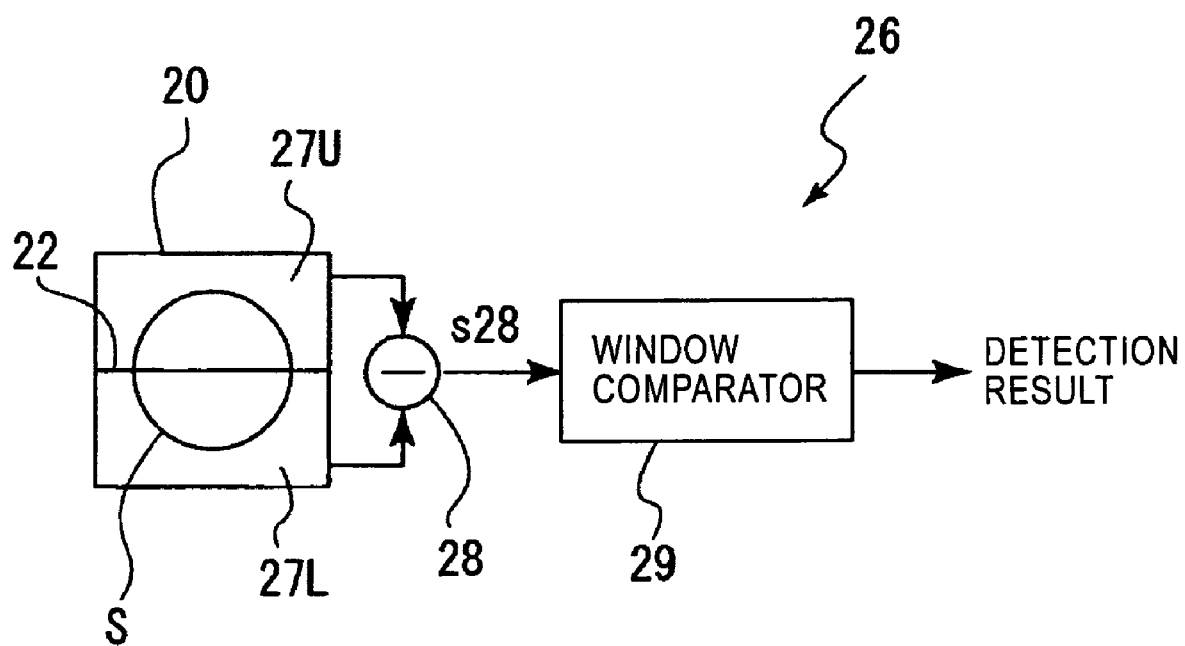
FIG. 5 illustrates the processing of detection for determining a split line.

FIG. 5 shows an exemplary structure of split-line determining means (or split-line changing means) 26 for determining which split line functions as the detection reference line, depending on the spot position of the returning light on the light-receiving surface.

In this example, a detection signal acquired by detection area 27U located above the split line 22 in the figure (corresponding to 21A and 21B in FIGS. 4A and 4C) is sent to the subtractor 28, and a detection signal acquired by detection area 27L located below the split line 22 (corresponding to 21C and 21D in FIGS. 4A to 4C) is sent to the subtractor 28.

Figure 6:
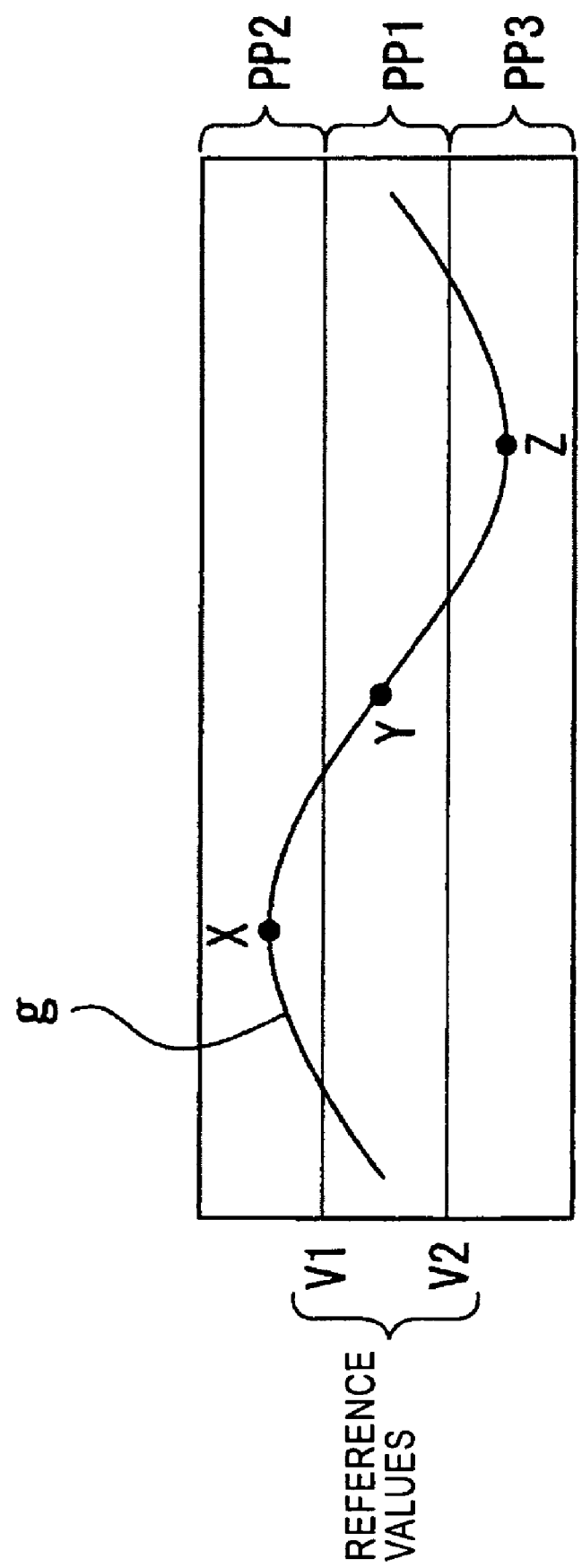
FIG. 6 is an illustration where the position of a light spot on a light-receiving surface is detected in three steps.

An output signal of the subtractor 28 (denoted as "s28") is sent to a window comparator 29 for level detection, and is then compared against the reference values which determine the detection window (with reference to V1 and V2 in FIG. 6).

FIG. 6 is a diagram for illustrating level comparison, where a wave-shaped curve g represents a differential signal acquired by the subtractor 28.

The reference values V1 and V2 are both set in the window comparator 29. In the figure, V1 is an upper limit value and V2 is a lower limit value.

As shown by spot Y on the curve g, if the level of the signal s28 is located between the reference values V1 and V2, it means that the center of the light spot S is located near the center of the light-receiving surface, and hence the above-described PP1 should be selected as a push-pull signal.

As shown by spot Z on the curve g, if the level of the signal s28 is below the reference value V2, it means that the center of the light spot S is located below the center of the light-receiving surface, and hence the above-described PP3 should be selected as a push-pull signal. As shown by spot X on the curve g, if the level of the signal s28 is above the reference value V1, it means that the center of the light spot S is located above the center of the light-receiving surface, and hence the above-described PP2 should be selected as a push-pull signal.

Thus, a differential signal is calculated between signals acquired from the detection areas delimited by the split line running through the center of the light-receiving surface, and is then compared against the reference values by the comparison means (window comparator 29) to detect a shift (displacement) of the light spot on the light-receiving surface. In short, the window comparator 29 functions as means for detecting a positional deviation of the returning light spot on the light-receiving surface based on the absolute value or amplitude of the differential signal from the subtractor 28. A push-pull signal may be acquired through phase detection. To detect the light spot position on the light-receiving surface, however, it is preferable to use the absolute value or amplitude of a signal, thereby allowing the split line to be easily determined from the result of the position detection. Another advantage is that complicated circuit structures are not required.

To set the above-described reference values V1 and V2 used for the level comparison, the following embodiments are possible.

(1) Predetermined reference values are used.

(2) Reference values are changed or updated depending on a change in environment or over time.

In (1), the reference values may be preset by the manufacturer at the time of manufacturing or shipment, and thereafter the values are maintained constant or made variable to allow adjustment by service personnel at the time of maintenance or repair.

In (2), the reference values may be changed or calibrated regularly or at the time of apparatus startup according to detection information from detecting means such as a temperature sensor. In short, a shift of the light spot on the light-receiving surface is affected mainly by a temperature change or a change over time of the optical pickup, and hence the reference values are made dynamically settable, rather than fixed reference values (automatic adjustment is more preferable than manual adjustment).

Figure 7:
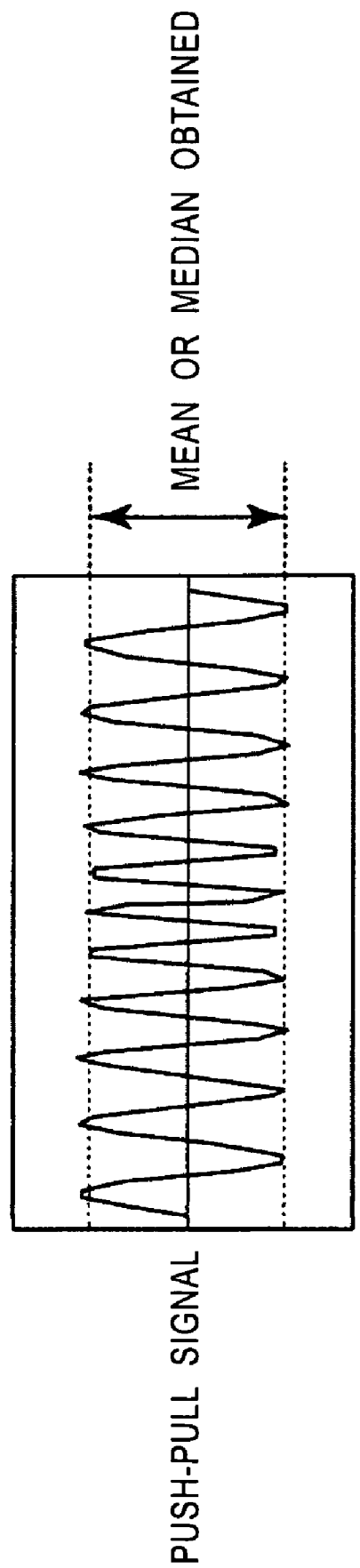
FIG. 7 shows an exemplary waveform of a push-pull signal acquired without tracking servo to illustrate the settings of reference values for detecting the position of a light spot.

FIG. 7 shows an example of a change over time in a push-pull signal acquired while the objective lens driving associated with tracking control is disabled.

In determining the above-described reference values V1 and V2, the mean or median of the push-pull signal shown in the figure can be used for the value based on which V1 and V2 are determined (signal value at the neutral position of the light spot). In other words, in order to detect the neutral position of the light spot, a method based on the mean detected and a method based on the median acquired from the detected peak value and bottom value (or the mean of them) of the signal are available.

The two reference values V1 and V2 are set to detect the light spot position in three steps. To detect the light spot position in N steps, it is necessary to set "N−1" reference values to detect the deviation of the light spot on the light-receiving surface.

Figure 8:
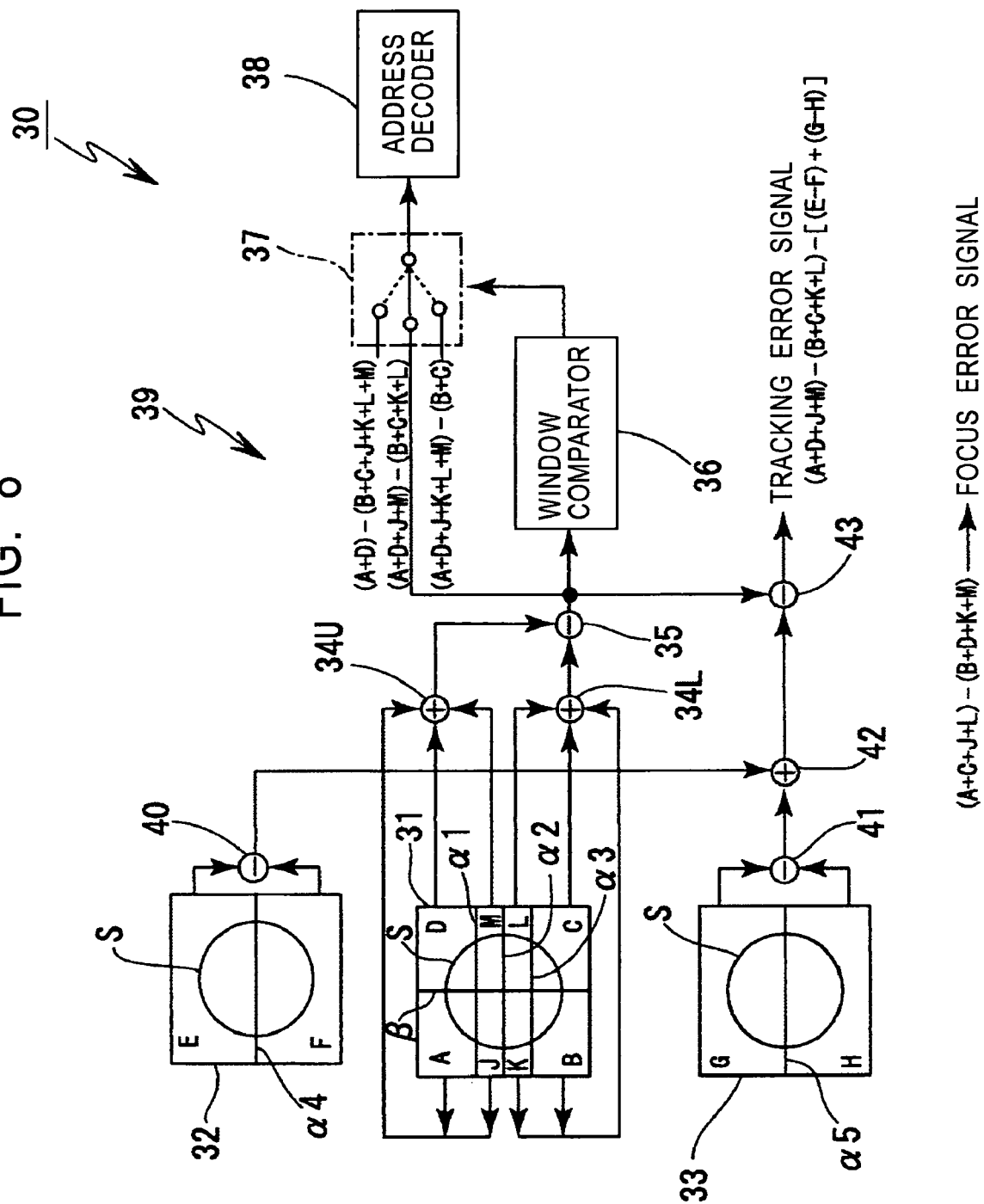
FIG. 8 illustrates an exemplary structure of detecting means according to the present invention.
Figure 9:
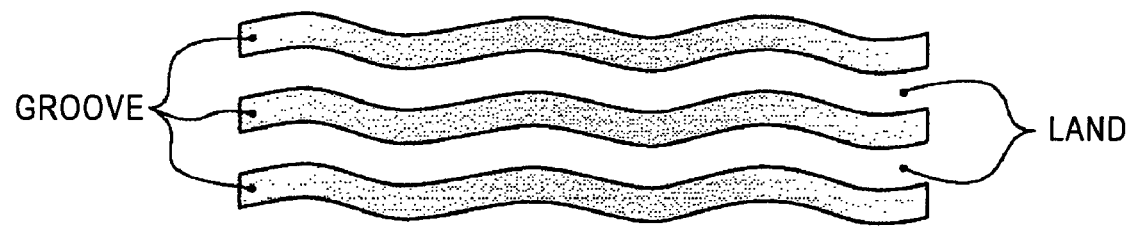
FIG. 9 is a schematic diagram showing wobbling.
Figure 10:
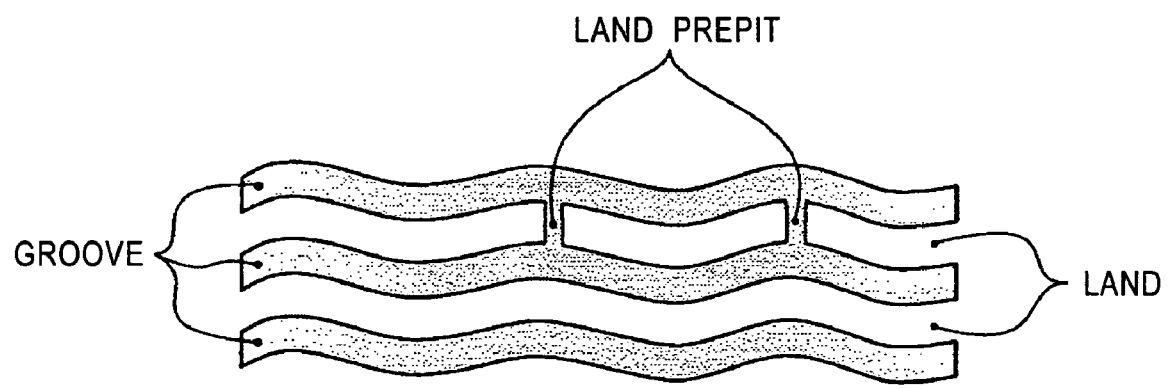
FIG. 10 is a schematic diagram showing land prepits (LPP).
Figure 11:
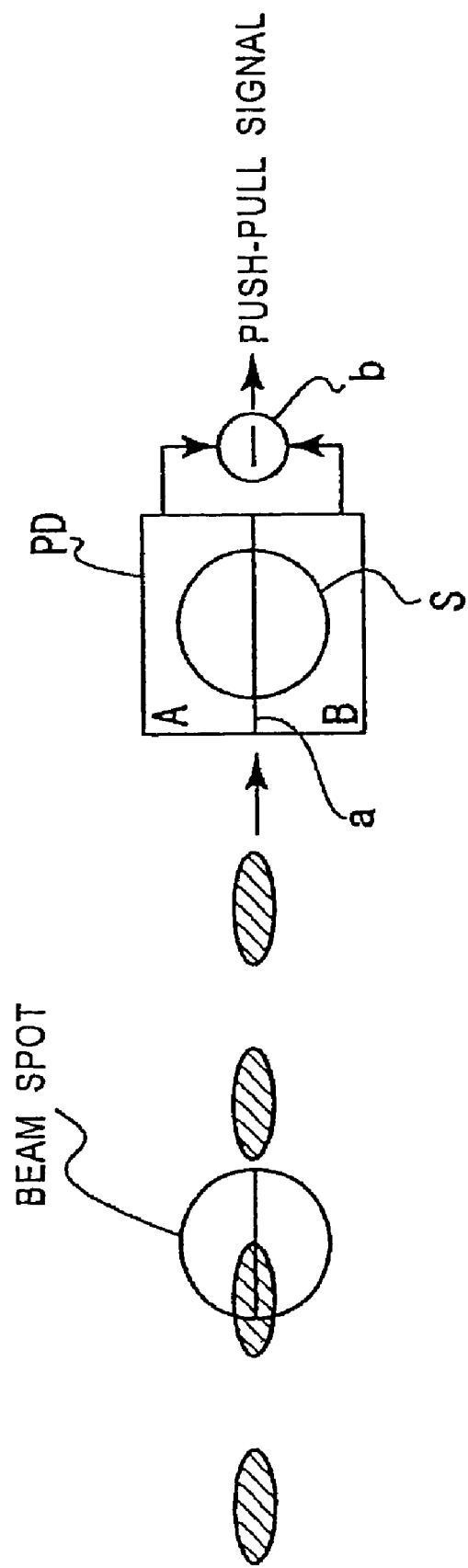
FIG. 11 illustrates the generation of a push-pull signal using a two-split detector.

FIG. 8 shows an exemplary structure of detecting means 30 for detecting returning light from an optical recording medium to acquire a push-pull signal. In this example, the astigmatic method is used as a focus detection method. As a tracking detection method, the differential push pull (DPP) method where the push-pull method is applied to the three spots is used.

Three light-receiving devices 31, 32, and 33 functioning as the detecting means 30 have a plurality of detection areas generated by dividing the light-receiving surface by split lines.

The light-receiving device 31 associated with detection of a 0-order light spot is divided into eight detection areas (A to D and J to M) by three parallel split lines $\alpha 1$, $\alpha 2$, and $\alpha 3$ and one split line $\beta$ perpendicular to the parallel split lines $\alpha 1$, $\alpha 2$, and $\alpha 3$. In detail, the light-receiving surface is divided into three substantially equal segments by the split lines $\alpha 1$ and $\alpha 3$ in the up/down direction of the figure, and the segment between the split lines $\alpha 1$ and $\alpha 3$ is further divided into two equal subsegments by the split line $\alpha 2$. In the left/right direction of the figure, the light-receiving surface is divided into two equal segments by the split line $\beta$.

The detection areas are as described below.

Areas "A", "D"→areas above the split line $\alpha 1$.

Areas "B", "C"→areas below the split line $\alpha 3$.

Areas "J", "M"→areas between split lines $\alpha 1$ and $\alpha 2$.

Areas "K", "L"→areas between the split lines $\alpha 2$ and $\alpha 3$.

Areas "A", "J", "K", "B"→areas to the left of the split line P.

Areas "D", "M", "L", "C"→areas to the right of the split line $\beta$.

Each of the light-receiving devices 32 and 33 associated with the detection of a diffraction spot of the returning light is divided into two areas, which are symmetrical with respect to the split line.

For example, the light-receiving surface of the light-receiving device 32 is divided into two equal areas by the split line $\alpha 4$ extending in the left/right direction of the figure, where a detection area "E" is located above the split line $\alpha 4$ and detection area "F" is located below the split line $\alpha 4$. The light-receiving surface of the light-receiving device 33 is divided into two equal areas by the split line $\alpha 5$ extending in the left/right direction of the figure, where detection area "G" is located above the split line $\alpha 5$ and detection area "H" is located below the split line $\alpha 5$.

Starting with a description of signal processing associated with light-receiving device 31, the device is provided with two adders 34U and 34L and a subtractor 35. The adders 34U and 34L have a multiple-input single-output structure (hereinafter, detection signals are identified using the same symbols as assigned to the detection areas A to H).

Detection signals respectively acquired from the detection areas A, J, D, and M above the split line $\alpha 2$ in the figure are passed to the adder 34U, where the signals are summed. The result (referred to as "A+J+D+M") is sent to the subtractor 35. Detection signals respectively acquired from the detection areas K, B, L, and C below the split line $\alpha 2$ in the figure are passed to the adder 34L, where the signals are summed. The result (referred to as "K+B+L+C") is sent to the subtractor 35.

In the subtractor 35, a signal "(A+D+J+M)−(B+C+K+L)" is acquired by subtracting "K+B+L+C" from "A+J+D+M" (the terms in parenthesis are rearranged in alphabetical order because addition is insensitive to term order). This signal, which corresponds to the above-described PP1, is sent to the window comparator 36 and to the selection section 37 and subtractor 43, which are described later. The window comparator 36 functions the same way as the above-described window comparator 29; namely, it detects the light spot position on the light-receiving surface in three steps, and determines a split line according to the spot position.

"(A+D+J+K+L+M)−(B+C)", which indicates a calculation result corresponding to the above-described PP2 where the light spot S is deviated towards one side (in the lower part of the figure) from the neutral position on the light-receiving surface, and "(A+D)−(B+C+J+K+L+M)", which indicates a calculation result corresponding to the above-described PP3 where the light spot S is deviated towards the other side (in the upper part of FIGS. 4A to 4C) from the neutral position on the light-receiving surface, are calculated and then sent to the selection section 37. These calculations, including the above-described calculation of "(A+D+J+M)−(B+C+K+L)", are carried out (subjected to matrix processing) in the calculating means 39. In other words, the calculating means 39 has a structure for four basic arithmetic operations in relation with the signals A to H, and functions to perform calculations based on the signals from the respective detection areas delimited by the split lines to acquire a push-pull signal.

The selection section 37 selects one of the above-described three arithmetic operation results according to the signal from the window comparator 36 and sends it to the downstream address decoder 38. In short, if the signal from the window comparator 36 indicates that the light spot S is located at the neutral position or near the neutral position, "(A+D+J+M)−(B+C+K+L)" is selected. If the signal from the window comparator 36 indicates that the light spot S is located below the neutral position in the figure, "(A+D+J+K+L+M)−(B+C)" is selected. In contrast, if the signal from the window comparator 36 indicates that the light spot S is located above the neutral position in the figure, "(A+D)−(B+C+J+K+L+M)" is selected.

The address decoder 38 is means for receiving a signal (push-pull signal) from the selection section 37 and extracting and playing back the address information contained in the signal (address playback means).

The tracking error signal is acquired by summing the differential signals acquired from the detection areas of the light-receiving devices 32 and 33, and then subtracting the result of summation from the output from the above-described subtractor 35. In other words, the signals based on respective detection areas E and F of the light-receiving device 32 are sent to the subtractor 40, where a differential signal "E−F" is acquired. On the other hand, the signals based on respective detection areas G and H of the light-receiving device 33 are sent to the subtractor 41, where a differential signal "G−H" is acquired. Subsequently, the outputs from the subtractors 40 and 41 are sent to the subtractor 42, where the outputs are summed. The result of summation is sent to the subtractor 43.

This subtractor 43 receives the result of calculation "(A+D+J+M)−(B+C+K+L)" from the subtractor 35, and the result of summation by the subtractor 42 is subtracted from "(A+D+J+M)−(B+C+K+L)" to acquire "[(A+D+J+M)−(B+C+K+L)]−[(E−F)+(G−H)]" as a tracking error signal.

The focus error signal is acquired as a result of calculation "(A+C+J+L)−(B+D+K+M)" based on the signal of each detection area in the light-receiving device 31. This is acquired by summing signals based on the areas which have a diagonal relationship from among the four areas delimited by the split lines α2 and β, and then subtracting between the results of summation. In short, assuming that the split lines α2 and β on the light-receiving surface represents position coordinate axes, the detection areas A and J in the second quadrant and the detection areas C and L in the fourth quadrant are taken as a set; those signals are then added, and the result ("A+C+J+L") is acquired. Similarly, the detection areas D and M in the first quadrant and the detection areas B and K in the third quadrant are taken as a set; those signals are then added, and the result "(B+D+K+M)" is acquired. Finally, subtraction is carried out between both the results (the structure for calculation is apparent from the arithmetic expression and hence is not illustrated).

As described so far, in application to the three-spot method in this example, a plurality of calculation results are acquired according to the position of the returning light spot, and one of the calculation results is selected according to the split line determined depending on the spot position, where the selected calculation result is employed as a push-pull signal. Undesirable RF components are reduced in the selected push-pull signal, and therefore the address information contained in the signal can easily be detected.

As a result, in application to a recording/playback apparatus with a disk (for example, CD-R/RW, DVD+RW, DVD-R/RW, DVR), address information recorded as wobble associated with guide grooves can be reliably and easily detected.

As is clear from the description above, according to the present invention, common-mode components in a push-pull signal can be eliminated or satisfactorily reduced by selecting one of the split lines according to the position of the returning light spot on the split light-receiving device. Consequently, information contained in the push-pull signal can be reliably played back, while still preventing the structure and processing from becoming extremely complicated.

According to the present invention, calculations necessary for the generation of a push-pull signal can be carried out based on the split line determined according to the position of the returning light spot on the light-receiving surface, whereby undesirable components in the push-pull signal can be reduced.

According to the present invention, a positional deviation of the returning light spot on the light-receiving surface of the light-receiving device can easily be detected.

According to the present invention, detection and playback of address information can be carried out reliably.

The invention claimed is:
1. An optical reading unit, comprising:
light radiating means for radiating light onto a recording medium;
detecting means for detecting returning light from the optical recording medium to acquire a push-pull signal, wherein a light-receiving device being the detecting means has detection areas delimited by a plurality of parallel split lines, and wherein the position of one of the split lines is determined according to the position of a spot of the returning light on a light-receiving surface of the light-receiving device, and the push-pull signal is the difference between signals received on two detection areas delimited by said one of the split lines;
split-line determining means for determining said one of the split lines as a detection reference line according to the position of the spot of the returning light on the light-receiving surface of the light-receiving device; and
calculating means for performing a calculation based on signals acquired from the detection areas delimited by the split lines to acquire the push-pull signal.

2. The optical reading unit according to claim 1, wherein the split-line determining means acquires a differential signal of detection signals acquired from two detection areas delimited by the central split line on the light-receiving surface of the light-receiving device, and detects a deviation of the position of the spot of the returning light on the light-receiving surface based on the absolute value or amplitude of the differential signal.

3. An information processing apparatus using an optical recording medium for reading and processing information by radiating light onto the optical recording medium, the apparatus comprising:

light radiating means for radiating light onto the optical recording medium;

detecting means for detecting returning light from the optical recording medium to acquire a push-pull signal, wherein a light-receiving device being the detecting means has detection areas delimited by a plurality of parallel split lines, wherein the position of one of the split lines is determined according to the position of a spot of the returning light on a light-receiving surface of the light-receiving device, and the push-pull signal is the difference between signals received on two detection areas delimited by said one of the split lines;

split-line determining means for determining said one of the split lines as a detection reference line by detecting the position of the spot of the returning light on the light-receiving surface of the light-receiving device; and calculating means for performing a calculation based on signals acquired from the detection areas delimited by the split lines to acquire the push-pull signal.

4. The information processing apparatus using an optical recording medium according to claim 3, wherein the split-line determining means acquires a differential signal of detection signals acquired from two detection areas delimited by the central split line on the light-receiving surface of the light-receiving device, and detects a deviation of the position of the spot of the returning light on the light-receiving surface based on the absolute value or amplitude of the differential signal.

5. An information playback method for playing back information by radiating light onto an optical recording medium and detecting returning light from the optical recording medium to acquire a push-pull signal, the method comprising:

setting a plurality of parallel split lines on a light-receiving surface of a light-receiving device associated with detection of the returning light to divide the light-receiving surface into a plurality of detection areas; and changing the position of one of the split lines functioning as a detection reference line according to the position of a spot of the returning light on the light-receiving surface and acquiring the push-pull signal by acquiring the difference between signals received on two detection areas delimited by said one of the split lines.

6. The information playback method according to claim 5, wherein address information contained in the push-pull signal is played back.

7. The information playback method according to claim 6, wherein the address information is wobble information recorded on an optical recording medium.

* * * * *